United States Patent [19]

Bromberg

[11] 4,280,864
[45] Jul. 28, 1981

[54] APPARATUS AND METHOD FOR LINING CAPS

[75] Inventor: Henry Bromberg, Providence, R.I.

[73] Assignee: Tech Industries, Inc., Woonsocket, R.I.

[21] Appl. No.: 131,434

[22] Filed: Mar. 17, 1980

[51] Int. Cl.³ .......................... B29B 3/02; B29C 19/00
[52] U.S. Cl. ................................... 156/500; 113/80 D;
113/80 DA; 118/244; 118/254; 118/267;
156/244.15; 156/244.25; 156/262; 156/293;
156/295; 156/423; 156/567; 156/578; 222/146
HE; 264/268; 425/114; 425/809
[58] Field of Search .............. 156/262, 423, 293, 567,
156/295, 578, 357, 244.15, 244.25, 500; 222/146
HE; 113/808, 808 A; 215/349; 118/244, 267,
254; 264/268; 425/114, 809

[56] References Cited

U.S. PATENT DOCUMENTS

| 1,858,279 | 5/1932 | Parker | 156/293 |
|---|---|---|---|
| 2,876,692 | 3/1959 | Gaisman | 215/349 |
| 2,976,200 | 3/1961 | Stover | 156/295 |
| 3,116,194 | 12/1963 | Looser | 156/500 |
| 3,343,211 | 9/1967 | Strickman | 425/809 |
| 3,496,060 | 2/1970 | Pitz et al. | 156/262 |
| 3,746,570 | 7/1973 | McIntosh | 222/146 HE |

*Primary Examiner*—John J. Gallagher
*Attorney, Agent, or Firm*—Robert J. Doherty

[57] ABSTRACT

A device and method for applying a semi-liquid adhesive material in a preselected pattern upon a surface such as the inner surface of a container cap such that a liner may be adhesively connected thereto. The device and its manner of operation are particularly suited for the application of hot melt adhesive to container caps of the type having a central recess surrounded by an annular ledge. A member having a longitudinal bore in which a shaft having one or more external helical grooves is rotationally disposed, cooperates to form the applicating device. One end of the member is operationally associated with a supply of semi-liquid adhesive such that rotation of the shaft with respect to the member will force adhesive along the separate helical paths and on to the receiving surface of the cap in the desired configuration.

11 Claims, 10 Drawing Figures

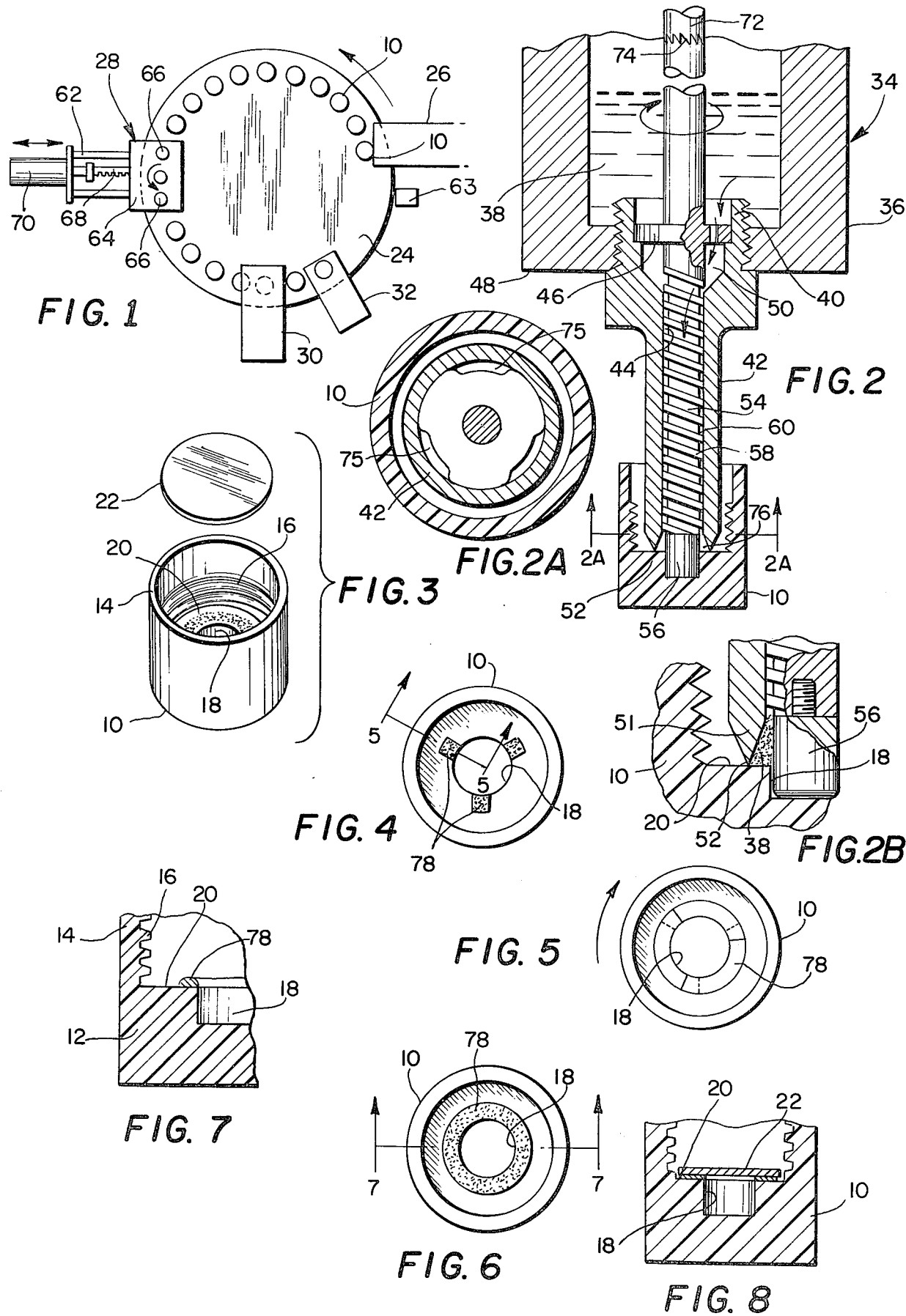

APPARATUS AND METHOD FOR LINING CAPS

BACKGROUND & SUMMARY OF THE INVENTION

This invention relates to an improved device and manner whereby liners may be adhesively connected to the interior portions of container caps and the like and more particularly to a novel device for applying adhesive in a particular pattern and configuration upon the receiving surface of the cap prior to affixing a liner thereto.

It is common in the manufacture of container caps to provide the interior portions of such caps with a liner. Such liner may be formed from a wide variety of sheet materials including paper, cork and more recently plastic resinous compositions. Generally a preformed disc of such material is adhesively connected to the bottom of the cap to provide a finished appearance to the interior of the caps structure as well as in some case functionally serving to sealingly engage the top edge of the container on which the cap is adapted to be utilized.

Automatic equipment to accomplish the above described steps is available and generally includes a rotating table adapted to serially receive the unlined bottle caps, position them beneath an applicator station wherein glue or adhesive is is deposited on the inside surface and then to a liner inserting station wherein a liner is positioned in the cap and in contact with the adhesive. After maintaining the liner and adhesive in pressure contact with each other, if necessary, for the desired length of time, the caps are then removed from the table for subsequent use after inspection, packing and the like.

Applicators which spray, i.e. spurt, a quantity of adhesive in preselected patterns on the interior surface of caps, i.e. a receiving surface, are known. Such devices are adequate for many cap configurations especially relatively large caps and those which utilize relatively conventional liner materials which are easy to adhesively connect to the receiving surface thereof. There are, however, many cap configurations which incorporate a recess or core in the base of the cap in a position below the level of the threads so as to reduce the amount of plastic material used therein. Such coring reduces the ultimate material cost of the cap as well as desirably decreasing the molding cycle time thereof. With such cored cap constructions it would be wasteful to apply glue or adhesive in the central recessed areas as too much material would be required to fill the recess or well to insure contact with the liner disc. This is particularly true of hot melt adhesives which are expensive and particularly suited to adequately attach liner discs formed from many desirable pastic resinous materials such as the polyolefins.

It is therefore apparent that it would be desirable to apply the adhesive to the surface of the relatively flat ledge surrounding the recess of such cored caps. However, attempts to accomplish this as by the application of the previously mentioned technique has not met with complete success in that the adhesive tended to be directed upon the threads and was otherwise unsatisfactory.

It would accordingly be desirable to be able to apply semi-liquid material such as a hot melt adhesive on such a cap ledge surface in such a manner that liner discs including those formed from difficult to attach plastic resinous compositions may be satisfactorily adhesively connected thereto without the necessity of modifying presently available automatic cap lining equipment. It is accordingly a primary object of the present invention to provide a device for applying adhesive in a preselected pattern upon a cap receiving surface in a new and novel manner which eliminates the drawbacks of prior art devices.

A still further object of the present invention is the provision of a novel method of adhesively connecting liners to caps including liners formed from relatively difficult materials to adhesively attach thereto.

These and other objects of the present invention are accomplished by the provision of the device and the manner in which it may be utilized as hereinafter disclosed.

DESCRIPTION OF THE DRAWING

In the drawing which illustrates the best mode presently contemplated for carrying out the present invention:

FIG. 1 is a schematic plan view of an automatic cap lining system in which the present invention may be utilized;

FIG. 2 is a sectional elevation on an enlarged scale of the device of the present invention;

FIG. 2A is an enlarged sectional view along the line 2A—2A of FIG. 2;

FIG. 2B is an enlarged sectional view of a portion of FIG. 2;

FIG. 3 is a perspective view showing the construction of a cap in which the device of the general present invention has particular utility in attaching a liner disc thereto;

FIG. 4 is a plan view of interior portions of a cap such as that shown in FIG. 3 in which a preselected pattern of adhesive has been laid down by the device of the present invention;

FIG. 5 is a view similar to FIG. 4 showing a different or continuing adhesive pattern;

FIG. 6 is a view similar to FIGS. 4 and 5 but showing a cap prior to insertion of the liner;

FIG. 7 is a sectional view taken along the line 7—7 in FIG. 6; and

FIG. 8 is a cross-sectional view similar to FIG. 7 but showing the liner applied to the cap in the desired manner.

DESCRIPTION OF THE INVENTION

Referring to the drawing particularly FIG. 3 thereof, a conventional container cap or closure 10 is depicted. Such cap includes a relatively thick body 12 having upstanding walls 14 which are internally provided with a screw thread 16 such that the cap may be threadably connected to the upstanding neck portion of a conventional container (not shown). The interior base of the cap is provided with centrally cored out portion or recess 18 so as to reduce the material usage and weight of the cap. An annular ledge 20 is accordingly defined about such recess 18. It is upon this ledge 20 that adhesive must be directed such that a liner 22 may be adhesively connected to the cap in the intended manner.

The liner 22 is generally of disc-like configuration and may be formed from any appropriate material such as paper, cork but preferably of a plastic resinous sheet material such as polyethylene or polypropylene. A desirable liner construction which may be utilized includes a sandwich construction in which polyolefin outer surfaces are separated by a foam interior. Such liners are quite difficult to adhesively attach to caps which are also generally formed from plastic compositions of either the thermosetting or thermoplastic type. It is accordingly desirable that hot melt adhesive compositions be used to accomplish such adhesive connection. Such hot melt adhesives provide high initial tack and strong bond characteristics and are readily commercially available. Other adhesive compositions may, of course, be utilized in the device and method of the present invention if desired and appropriate.

Turning now to FIG. 1 of the drawing, an automatic system for lining caps in the intended manner shown. Therein a rotary table 24 is positioned so as to receive a plurality of caps 10 one at a time at a loading station 26. Pockets or other known means (not shown) to receive and stablize the caps 10 in their inverted position as shown in FIG. 3 are provided. The table 24 thence rotates in the direction of the arrow shown to index one of the caps 10 beneath an adhesive application station 28 including the device of the present invention. Thereafter the table is further indexed such that the caps are serially presented to a lining station 30 whereupon the liner 22 is applied to the caps in the desired manner and thence to a take off station 32 whereupon the lined caps may be inspected and then packed for latter use.

The adhesive application device 34 of the present invention is best shown by simultaneous reference to FIGS. 1, 2, 2A and 2B. The device 34 or the station 28 includes a reservoir 36 in which a supply of adhesive 38 in liquid or semi-liquid form is contained. Heating elements may be positioned in the body of the reservoir 36 so as to maintain the adhesive 38 at the correct temperature. The bottom of the reservoir 36 includes a threaded opening in receipt of a threaded bushing 40 on an elongated member 42. The elongated member includes a longitudinally extending smooth wall bore 44 which forms an opening at both the upper and lower ends of the member 42. The upper end of the member 42 is in communication with the supply of adhesive 38 and may include a straining element 46 disposed upon a ledge 48 in turn inwardly projecting from an upper extension 50 of the bore 44. The lower end of the member 42 terminates in a generally V-shaped terminal end 51 defining a narrow edge 52 which in turn is adapted to contact the receiving surface or ledge 20 in the operational mode of the device.

A shaft 54 is positioned within the bore 44 and includes an extension 56 at the lower end thereof. Such extension 56 may be in the form of a separate cylindrical plug which is threadably connected to the lower end of the shaft 54. The shaft 54 is in turn provided with at least one and preferably a plurality, i.e. three separate and continuous helical grooves on the outer surface thereof so as to define a plurality of separate helical, i.e. spiral, paths 60 in combination with the interior wall portions of the bore 44. Such paths 60 provide the means in which adhesive 38 from reservoir 36 may be forced downwardly into contact with the receiving surface 20. Such action is aforded by rotation of the shaft 54 in a single rotational direction such as the clockwise direction depicted in the drawing.

It should also be pointed out that the table 24 and the adhesive application station 28 are capable of relative vertical movement with respect to each other. Such movement may be carried out by upwardly moving the table 24 when it has been indexed so as to position a cap 10 beneath the dispensing device 34 or by mounting the application station 28 upon a vertically movable plate (not shown) overlying the table 24. Thereafter, as the edge 52 approaches or makes contact with the ledge surface 20, a rotation assembly 62 is activated so as to force adhesive 38 onto surface 20 in the intended manner as will hereinafter be described. The rotation assembly may be triggered by a microswitch 63 associated with the table 24 or the plate (not shown) and adapted to sense when the edge 52 is in its most proximal position with regard to the receiving surface 20. Other known mechanisms such as an electric eye may, of course, be substituted for the microswitch in order to periodically activate the rotation assembly 62. In addition the microswitch 63 or other such mechanism could operate directly off the member 42 or other portion of the station 28.

Such assembly includes a plate 64 supported above the device 34 on a pair of spaced posts 66 upwardly extending therefrom. The upper end of the shaft 54 is journaled in the plate 64 and a toothed rack 68 is adapted to engage said end to rotate such. Reciprocal motion of the rack 68 is accomplished by a piston 70. The upper end of the shaft 54 includes a stub extension 72 which in turn engages the rack 68. The stub shaft 72 terminates at its lower end in a one-way rotational slip gear 74 as does the upper end of the shaft 54 such that the shaft 54 can be rotated only by the forward movement of the rack 68. On the return stroke of the rack, the slip gear 74 permits frictional slippage such that the stub extension rotation does not impart rotation to the shaft 54. Other one-way directional mechanisms may, of course, be utilized.

As best shown in FIG. 2A, the grooves 60 at the lower end of the shaft 54 each terminate in an open slot 75. In addition, the extension 56 is of a slightly lesser diameter than that of the shaft 54 so as to provide suitable space to accommodate such slots, that is, extension 56 does not block the slots 75 and accordingly permits adhesive 38 to be forced downwardly by rotation of the shaft 54 into a generally conical space 76 defined by the upper surface of the ledge 20, the outer surface of the extension 56 and the inner angular surface of the member terminal end 51. Such configuration is best apparent by a reference to FIG. 2B wherein it is also apparent that the extension 56 is adapted for receipt in the recess 18 and in this manner serves to orient the member 42 and thus the dispensing assembly 34 with respect to the caps 10. By providing the terminal end 51 of the member 42 with a relatively sharp edge 52 then upon withdrawal of the plate 24 after the adhesive 38 has been dispensed into the space 76, the tendency of strings of adhesive to form at the edge 52 is reduced as is the possible tendency of adhesive material to creep past the edge 52 and extend radially outwardly therefrom onto the outer portions of the ledge 20. It is important in this invention and in particular when utilizing hot melt adhesives that the space into which the adhesive 38 is forced by the aforementioned dispensing action is of a relatively conical configuration, that is, that the adhesive be disposed upon the surface 20 in a vertically oriented heaped condition. This is so that there is a relatively thick layer of adhesive placed upon the ledge 20 in order to provide effective thermal insulation from the body 12 of the cap. In that regard the cap body 12 represents a heat sink which can in some cases undesirably too quickly cool the adhesive 38. This effect, of course, is particularly undesirable when using hot melt adhesives which only retain their adhesive qualities above a particular temperature range.

Referring now to FIGS. 4 through 6, it may be apparent that each of the slots 75 will cover a limited arcuate segment of a complete annular ring of adhesive 78 preferably to be positioned on the ledge 20. Thus by providing three separate helical grooves 58, the slots 75 will be positioned at 120° apart from each other along the circumference of the lower face of the shaft 54. Accordingly a 120° rotation of the shaft 54 will lay down an entire annular ring of adhesive 78. Also, in order to insure proper thermal insulation of the adhesive ring, the shaft 54 may also be rotated more than 120° when utilizing the three separate helical groove paths. Such action insures that enough adhesive 38 is forced into the space 76 and in effect causes an overlap of one adhesive layer upon another adhesive layer as illustrated by the dotted lines in FIG. 5. Of course, it should be realized that even when only one groove 58 is utilized and accordingly only one slot 72 present, that a 360° rotation would result in the formation in the desired annular ring 78. In some instances it may, however, not be necessary to form the completed ring structure. When the desired amount of adhesive has been laid down in the desired pattern configuration, a liner 22 is fed by the lining station 30 upon the heap of adhesive, i.e. upon the annular ring 78 thereof and then pressure applied if desired until the liner 22 is firmly attached to the base of the cap 10.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for applying a viscous liquid material such as a hot melt adhesive in a preselected pattern such as an annular ring upon a receiving surface including a central area comprising, an elongated member having an open longitudinal bore and including upper and lower ends thereof, a longitudinally directed shaft extending through said bore and adapted for limited relative rotational contact therewith, said shaft including an extension at the lower end thereof, said extension having a lower surface adapted to contact said central area of said receiving surface, said member lower end terminating in an edge outwardly radially offset from said extension and forming a space therebetween, said shaft and said member bore cooperating to define at least one generally closed continuous helical grooved path operatively associated with a supply of said material at its upper end and terminating in at least one open arcuately shaped slot at its lower end, said slot positioned at the top of said space and extending substantially less than the full perimetal extent of such space at the top thereof, and means for effecting said relative rotation so as to force said material along said grooved path and out of said slot in a heaped pile along at least an arcuate portion of said ring pattern.

2. The device of claim 1, said space being of a generally conical shape.

3. The device of claim 1, said receiving surface including a central recess and said extension outwardly downwardly projecting from said member lower end for positioning in said recess.

4. The device of claim 1, said member lower end edge being of a relatively sharp pointed configuration.

5. The device of claim 4, said member lower end of generally V-shaped configuration.

6. The device of claim 1, there being a plurality of said grooved paths, each said path terminating in a separate open slot, said slots circumferentially spaced about the periphery of said shaft at the lower end thereof.

7. The device of claim 1, said rotation means effective to cause rotation of said grooved path in one direction only.

8. The device of claim 1, said member bore being smooth and said shaft being provided with at least one continuous helical groove.

9. The device of claim 8, said shaft having a plurality of separate helical grooves, each of said grooves terminating in a separate open slot, said slots circumferentially spaced about the periphery of said shaft at the lower end thereof.

10. The device of claim 9, said receiving surface including a central recess, said member lower end terminating in a relatively sharp edge in turn adapted to contact said receiving surface and said shaft extension extending below said member lower end terminal edge and in turn adapted to project into said recess.

11. The device of claims 1 or 10, said receiving surface being a relatively flat interior surface of an open cap, said device positioned above a rotating feed table for said caps with said member positioned so as to serially project into said caps, said table and said member adapted for periodic relative longitudinal movement towards and away from each other so as to periodically cause said member to contact said surface, and means for activating said rotation means when said member is in contact with said surface.

* * * * *